US012134411B2

(12) United States Patent
Austrheim et al.

(10) Patent No.: US 12,134,411 B2
(45) Date of Patent: Nov. 5, 2024

(54) MODULAR CONTAINER ACCESSING STATION

(71) Applicant: Autostore Technology AS, Nedre Vats (NO)

(72) Inventors: Trond Austrheim, Etne (NO); Øystein Gjerdevik, Skjold (NO); Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 324 days.

(21) Appl. No.: 17/618,081

(22) PCT Filed: Oct. 16, 2019

(86) PCT No.: PCT/EP2019/078107
§ 371 (c)(1),
(2) Date: Dec. 10, 2021

(87) PCT Pub. No.: WO2020/249244
PCT Pub. Date: Dec. 17, 2020

(65) Prior Publication Data
US 2022/0297938 A1      Sep. 22, 2022

(30) Foreign Application Priority Data
Jun. 11, 2019   (WO) ................ PCT/EP2019/065204

(51) Int. Cl.
*B65G 1/04*        (2006.01)
*B61B 13/00*       (2006.01)
(Continued)

(52) U.S. Cl.
CPC ............ *B61B 13/00* (2013.01); *B65G 1/0414* (2013.01); *B65G 1/0457* (2013.01);
(Continued)

(58) Field of Classification Search
CPC .... B61B 13/00; B65G 1/0414; B65G 1/0457; B65G 1/0464; B65G 1/0471;
(Continued)

(56) References Cited

U.S. PATENT DOCUMENTS

| 4,538,950 A | 9/1985 | Shiomi et al. |
| 2014/0086714 A1 | 3/2014 | Malik |
| 2016/0325932 A1* | 11/2016 | Hognaland .......... B65G 1/0478 |

FOREIGN PATENT DOCUMENTS

| CN | 108064212 A | 5/2018 |
| CN | 108806115 A | 11/2018 |

(Continued)

OTHER PUBLICATIONS

International Search Report issued in PCT/EP2019/078107 on Feb. 21, 2020 (6 pages).
(Continued)

*Primary Examiner* — Saul Rodriguez
*Assistant Examiner* — Lucia Elba Rodriguez
(74) *Attorney, Agent, or Firm* — Baker Botts L.L.P.

(57) ABSTRACT

A container accessing station is configured to offer multiple access points where access to each access point may be permitted through an upper working surface of the container accessing station to an underlying container that has been delivered to the access point. The container accessing station includes one or more working surface sections, access panels and blanking-off panels. Each working surface section has a common attachment configuration to allow either the access panel or the blanking-off panel to be fitted as part of the container accessing station at any of the multiple access points.

12 Claims, 9 Drawing Sheets

(51) Int. Cl.
| | |
|---|---|
| *B65G 1/06* | (2006.01) |
| *B65G 1/137* | (2006.01) |
| *B65G 47/06* | (2006.01) |
| *B65G 47/52* | (2006.01) |
| *B65G 57/03* | (2006.01) |
| *B65G 63/06* | (2006.01) |
| *B65G 65/23* | (2006.01) |
| *B65G 67/24* | (2006.01) |
| *B66F 9/06* | (2006.01) |
| *B66F 9/19* | (2006.01) |
| *G05D 1/00* | (2006.01) |
| *B60W 50/00* | (2006.01) |
| *B65G 43/00* | (2006.01) |
| *B65G 63/00* | (2006.01) |

(52) U.S. Cl.
CPC ......... *B65G 1/0464* (2013.01); *B65G 1/0471* (2013.01); *B65G 1/0478* (2013.01); *B65G 1/0485* (2013.01); *B65G 1/0492* (2013.01); *B65G 1/065* (2013.01); *B65G 1/1375* (2013.01); *B65G 47/06* (2013.01); *B65G 47/52* (2013.01); *B65G 57/03* (2013.01); *B65G 63/06* (2013.01); *B65G 65/23* (2013.01); *B65G 67/24* (2013.01); *B66F 9/063* (2013.01); *B66F 9/19* (2013.01); *G05D 1/0011* (2013.01); *G05D 1/021* (2013.01); *G05D 1/0291* (2013.01); *B60W 50/0098* (2013.01); *B60W 2710/06* (2013.01); *B60W 2720/10* (2013.01); *B60W 2720/24* (2013.01); *B65G 1/1378* (2013.01); *B65G 43/00* (2013.01); *B65G 63/004* (2013.01); *B65G 2201/0235* (2013.01); *B65G 2201/0258* (2013.01); *B65G 2203/0283* (2013.01); *B65G 2203/042* (2013.01); *G05D 1/02* (2013.01); *G05D 1/0229* (2013.01); *G05D 1/0231* (2013.01); *G05D 1/0259* (2013.01); *G05D 1/0289* (2013.01)

(58) Field of Classification Search
CPC .. B65G 1/0478; B65G 1/0485; B65G 1/0492; B65G 1/065; B65G 1/1375; B65G 47/06; B65G 47/52; B65G 57/03; B65G 63/06; B65G 65/23; B65G 67/24; B65G 1/1378; B65G 43/00; B65G 63/004; B65G 2201/0235; B65G 2201/0258; B65G 2203/0283; B65G 2203/042; B65G 1/0407; B66F 9/063; B66F 9/19; G05D 1/0011; G05D 1/021; G05D 1/0291; G05D 1/02; G05D 1/0229; G05D 1/0231; G05D 1/0259; G05D 1/0289; B60W 50/0098; B60W 2710/06; B60W 2720/10; B60W 2720/24

See application file for complete search history.

(56) References Cited

FOREIGN PATENT DOCUMENTS

| EP | 3843056 A1 | 6/2021 | | |
|---|---|---|---|---|
| JP | 2018-070369 A | 5/2018 | | |
| NO | 317366 B1 | 10/2004 | | |
| WO | 2012/106746 A1 | 8/2012 | | |
| WO | 2012/106747 A1 | 8/2012 | | |
| WO | 2013/033743 A1 | 3/2013 | | |
| WO | 2014/090684 A1 | 6/2014 | | |
| WO | 2015/084236 A1 | 6/2015 | | |
| WO | 2015/193278 A1 | 12/2015 | | |
| WO | 2016/196815 A1 | 12/2016 | | |
| WO | WO-2017197121 A1 | * | 11/2017 | ........... B65G 1/0478 |
| WO | 2018/162757 A1 | | 9/2018 | |
| WO | WO-2018233886 A1 | * | 12/2018 | ........... B65G 1/0464 |
| WO | 2019/086237 A1 | | 5/2019 | |
| WO | WO-2020236641 A1 | * | 11/2020 | ........... B65G 1/0435 |

OTHER PUBLICATIONS

Written Opinion of the International Searching Authority issued in PCT/EP2019/078107 on Feb. 21, 2020 (10 pages).
International Search Report issued in PCT/EP2019/065204 on Oct. 24, 2019 (5 pages).
Written Opinion of the International Searching Authority issued in PCT/EP2019/065204 on Oct. 24, 2019 (13 pages).
Office Action issued in corresponding Chinese Application No. 2019800973971, dated Dec. 23, 2022 (15 pages).

* cited by examiner

A

B

A

B

MODULAR CONTAINER ACCESSING STATION

The present invention is related to a modular container accessing station configured to offer multiple access points, where the station comprises one or more working surface sections, each working surface section having a common attachment configuration to allow either an access panel or a blanking-off panel to be fitted as part of the container accessing station at any of the multiple access points. The invention is also directed to a delivery system comprising the modular container accessing station.

BACKGROUND AND PRIOR ART

FIGS. 1A and 1C disclose a typical prior art automated storage and retrieval system 1 with a framework structure 100. FIGS. 1B and 1D disclose a prior art container handling vehicle 101 operating the system 1 disclosed in FIGS. 1A and 1C, respectively.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 of storage containers 106, also known as bins, are stacked one on top of another to form stacks 107. Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 200,300 (as exemplified in FIGS. 1B and 1D) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 1C marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108 comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines grid columns above which the container handling vehicles 200,300 can move laterally above the storage columns 105, i.e. in a plane which is parallel to the horizontal X-Y plane.

Each prior art container handling vehicle 200,300 comprises a vehicle body and a wheel arrangement of eight wheels 201,301 where a first set of four wheels enable the lateral movement of the container handling vehicles 200,300 in the X direction and a second set of the remaining four wheels enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device (not shown) for vertical transportation of storage containers 106, e.g. raising a storage container 106 from, and lowering a storage container 106 into, a storage column 105. The lifting device comprises one or more gripping/engaging devices (not shown) which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y.

Conventionally, and also for the purpose of this application, $Z=1$ identifies the uppermost layer of the grid 104, i.e. the layer immediately below the rail system 108, $Z=2$ the second layer below the rail system 108, $Z=3$ the third layer etc. In the exemplary prior art grid 104 disclosed in FIGS. 1A and 1C, $Z=8$ identifies the lowermost, bottom layer of the grid 104. Consequently, as an example, and using the Cartesian coordinate system X, Y, Z indicated in FIGS. 1A and 1D, the storage container identified as 106' in FIG. 1A can be said to occupy grid location or cell $X=10, Y=2, Z=3$. The container handling vehicles 101 can be said to travel in layer $Z=0$ and each grid column can be identified by its X and Y coordinates.

Each container handling vehicle 200 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 300 may have a cantilever construction, as is described in NO317366, the contents of which are also incorporated herein by reference.

The container handling vehicles 200 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles 200 may have a footprint which is larger than the lateral extent of (lateral area defined by) a grid column 105, e.g. as is disclosed in WO2014/090684A1.

The rail system 108 may be a single rail system, as is shown in FIG. 2A. Alternatively, the rail system 108 may be a double rail system, as is shown in FIG. 2B, thus allowing a container handling vehicle 201 having a footprint generally corresponding to the lateral area defined by a grid column 112 to travel along a row of grid columns even if another container handling vehicle 200 is positioned above a grid column neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of rails 110a,110b of the first rails 110 and a pair of rails 111a,111b of the second set of rails 111. In FIG. 2B the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 2C, each grid cell 122 has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grids 104 in FIGS. 1A and 1C comprise two delivery columns 119 and 120. The first delivery column 119 may for example comprise a dedicated drop-off port where the container handling vehicles 200,300 can drop off storage containers 106 to be transported through the delivery column 119 and further to an access or a transfer station, and the second delivery column 120 may comprise a dedicated pick-up port where the container handling vehicles 200,300 can pick up storage containers 106 that have been transported through the delivery column 120 from an access or a transfer station. Each of the ports of the first and second delivery column may comprise a port suitable for both pick up and drop of storage containers.

When a storage container 106 stored in the grid 104 disclosed in FIG. 1A is to be accessed, one of the container handling vehicles 200,300 is instructed to retrieve the target storage container 106 from its position in the grid 104 and to transport it to or through the delivery column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the delivery column 119.

If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the delivery column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the delivery column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

A container accessing station may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

The container accessing station may be provided in a delivery system arranged below the lower ports of the delivery column. The delivery system may comprise vehicles or carriers for carrying containers between the lower ports of the delivery column and the container accessing station.

The container accessing station may be a cabinet comprising an opening on top of the cabinet through which access to the contents in a storage container may be provided through the opening. Very often the container accessing station are predesigned and tailormade to a specific picking station. There are no or less possibilities to change or adapt the container accessing station to changing needs.

It is therefore an object of the present invention to provide a container accessing station which can easily be remodeled to fit the changing needs of the storage and retrieval system.

SUMMARY OF THE INVENTION

The present invention is directed to a container accessing station which has been configured to offer multiple access points where access to each access point may be permitted through an upper working surface of the container accessing station to an underlying container that has been delivered to the access point.

The working surface is provided by one or more working surface sections, each working surface section having a common attachment configuration to allow either an access panel or a blanking-off panel to be fitted as part of the container accessing station at any of the multiple access points.

The container accessing station may be used in the above described automated storage and retrieval system in order to provide an interface between a human or robotic operator (e.g., picker) and a container handling vehicle which deliver storage containers to the human or robotic operator.

A container accessing station may be a cabinet or a structure with a working surface supported thereon. The working surface is provided by one or more replaceable working surface sections.

The working surface section may be a blanking off-panel which restricts access through the working surface section, or an access panel which permits access through the working surface section.

A container accessing station may be manufactured with a plurality of rows of working surface section. Each surface section may initially be a blanking off-panel.

The container accessing station may easily be adapted to the storage and retrieval grid by replacing any of the blanking off-panels by an access panel in those locations where access to a storage container is desirable.

The container accessing station is configured to offer multiple access points where access to one access point may be permitted through an access panel that has been provided above the one access point.

Conversely, the access panel may be replaced by a blanking off-panel if access to the access point is no longer desirable or needed.

The container accessing station may be delivered from a factory in a standard module comprising for example four rows of working surface sections with walls or a wall structure supported thereon. Each of the working surface sections may be blanking off-panels that can be removed and replaced by an access panel if access to the underlying access point is required. If later, access to more access points are required, another blanking off-panel may be replaced by the access panel.

The solution works also the other way around. If access to an access point is no longer required, the access panel may be replaced by the blanking off-panel.

Each working surface section comprising a common attachment configuration to allow either an access panel or a blanking-off panel to be fitted as part of the container accessing station at any of the multiple access points.

It may be preferable that the access panels and the blanking-off panels each having the same size and a rectangular shape. The access panel(s) and the blanking-off panel(s) may have substantially similar or identical perimeter configurations so that they can be fitted to the same underlying structure to allow them to be interchangeable (with minimal effort) as and when desired.

The working surface sections (the access panels and the blanking-off panels) may be supported at their outer perimeter by a top surface support structure comprising rails or bars provided at the top of the container accessing station.

The top surface support structure may have a rectangular shape such that the working surface sections easily can be placed onto the top surface support structure and such that the top surface support structure supports the outer perimeter of each of the working surface sections.

The working surface section may be attached to the support structure by at least any one of following attachment means: nails, screws, bolts, securing pins, clips, clamping mechanisms, quick-release mechanisms, magnets, Velcro or by friction.

The access panel may comprise a portion of an electrical and/or control connector for providing power to and/or control of moving parts. The access panel may comprise a motor for operating and/or controlling moving parts. The moving parts may be operated and/or controlled electrically or pneumatically.

The access panel may comprise an access opening provided with an automated shutter which can open to provide access to the underlying container that has been delivered within the container accessing station to beneath the access point in the upper working surface of the container accessing station.

The automated shutter is a retractable cover arranged to open only if a predetermined condition is satisfied and thereby permit access to the container through the access opening.

The invention is also related to a delivery system comprising a container accessing station according as described above.

The delivery system comprises:
  a delivery rail comprising at least a first set of parallel rails arranged in a horizontal plane (P1) and extending in a first direction (X), and at least a second set of parallel rails arranged in the horizontal plane (P1) and extending in a second direction (Y) which is orthogonal to the first direction (X), the at least first and second sets of rails together defining a delivery grid of delivery grid cells,
  a delivery vehicle adapted for carrying the storage container and operating on the delivery rail for transporting the storage container to/from the container accessing station, and
wherein the delivery grid extends into the container accessing station providing one or more access points where access to each access point may be permitted through an upper working surface of the container accessing station. The delivery system may be part of the above described automated storage and retrieval system.

The delivery grid extends into the container accessing station and provides one or more delivery grid cells for the remotely operated delivery vehicle at the access point as well as a plurality of delivery grid cells adjacent the one or more delivery grid cells of the access point, such that there is more than one path to and/or from the access point for the remotely operated delivery vehicle (which is a type of container handling vehicle that delivers a storage container from the storage grid to the container accessing station) via the plurality of delivery grid cells.

The delivery system may comprise a locking device arranged for locking the delivery vehicle to the delivery grid at the access point. The locking device may be provided on the delivery grid cell at the access point, or the locking device may be provided on the access panel such that the delivery vehicle is restricted for movement while at the access point.

Thus, the locking device is arranged to be able to lock the delivery vehicle against accidental displacement prior to any interaction with a human operator and/or a robotic operator.

The locking device may comprise a locking element connected to a movable locking bolt and arranged on a panel structure in a delivery grid cell at the access point.

Actuation of a motor causes one end of the locking bolt to be raised through an opening in the panel structure such that it projects above the panel structure such that it engages with a part of the delivery vehicle. The locking bolt is sized and shaped to fit into an opening in the delivery vehicle.

The locking bolt may be cylindrical and fit into a circular opening in the delivery vehicle, but other configurations are also possible. For example, the locking bolt may have a plate-like structure. Its purpose is to engage with the vehicle to restrain it from moving whilst the human or robotic operator accesses the container.

The locking bolt may also be arranged in an opening provided on the access panel. Actuation of the bolt motor causes one end of the locking bolt to be raised through an opening in the access panel such that it projects into an opening of the delivery vehicle. The opening in the delivery vehicle may be on top side walls of the container carrier.

The delivery vehicle may also be held in a locking position at the access point by one or more flaps pivotably connected to the access panel such that the flaps may be rotated from the access panel and down into cooperation with the vehicle to restrict the delivery vehicle from moving.

Other locking devices may be grippers for interacting with the delivery vehicle, or magnetic devices for holding the vehicle in a desired position.

The delivery system may comprise one or more sensors arranged to detect a delivery vehicle in a locking position and one or more sensor is arranged to register the position of the retractable cover.

The may be provided on the walls of the cabinet, at an underside of the access panel, on the delivery grid cell at the access point or a combination thereof.

A control system may receive information from the one or more sensors and operates the retractable cover to open only when the delivery vehicle is locked at the access point.

The control system may also comprise a "reconfiguration" of the control system so that it knows which access point on the delivery grid is available to the user, and if these have been swapped around or expanded, that the control system is then updated with the new configuration.

The access panel may comprise one part of a plug and socket connection for conveying electrical signals, e.g., to activate a locking device, sensors and/or a retractable cover, a frame of the container accessing station comprising a second part of the plug and socket connection. Alternatively, wireless transmitters and receivers might be provided to convey such signals. A control system may be updated automatically such that it may read information from the sensors and control at least one of the locking device and the retractable cover.

In the case when the access panel is replaced by a blanking off-panel, the control system may then be updated with the new configuration.

The delivery grid may also be connected to a conveyor line extending from the delivery grid to the access point, such that the delivery vehicle may deliver a storage container to the conveyor line, for transport to the access point. The conveyor line may comprise rollers operable by a motor. When the storage container has been handled at the access point, the storage containers is transported on the conveyor line back to the delivery grid where it may be retrieved by the delivery vehicle for further transport.

The invention is also directed to a method of reconfiguring a container accessing station as described above. The method comprises the step of:
  unlocking a first surface section by releasing or removing attachment means securing the first surface section to the top surface of the container accessing station,
  removing the first surface section,
  replacing the first surface section by a second surface section,
  locking the second surface to the top surface of the container accessing station by the attachment means, and
  updating a control system to know that a new access point has been provided or closed below the second surface.

The attachment means may be at least any one of: nails, screws, bolts, securing pins, clips, clamping mechanisms, quick-release mechanisms, magnets, Velcro or friction.

The first surface section may be either a blanking off-panel or an access panel.

The second surface section may either a blanking off-panel or an access panel.

The first surface section is different than the second surface section. For example, if the first surface section is the blanking off-panel the second surface section is the access panel, and vice versa.

BRIEF DESCRIPTION OF THE DRAWINGS

Following drawings are appended by way of example only to facilitate the understanding of the invention.

DETAILED DESCRIPTION OF THE INVENTION

Figure 1:
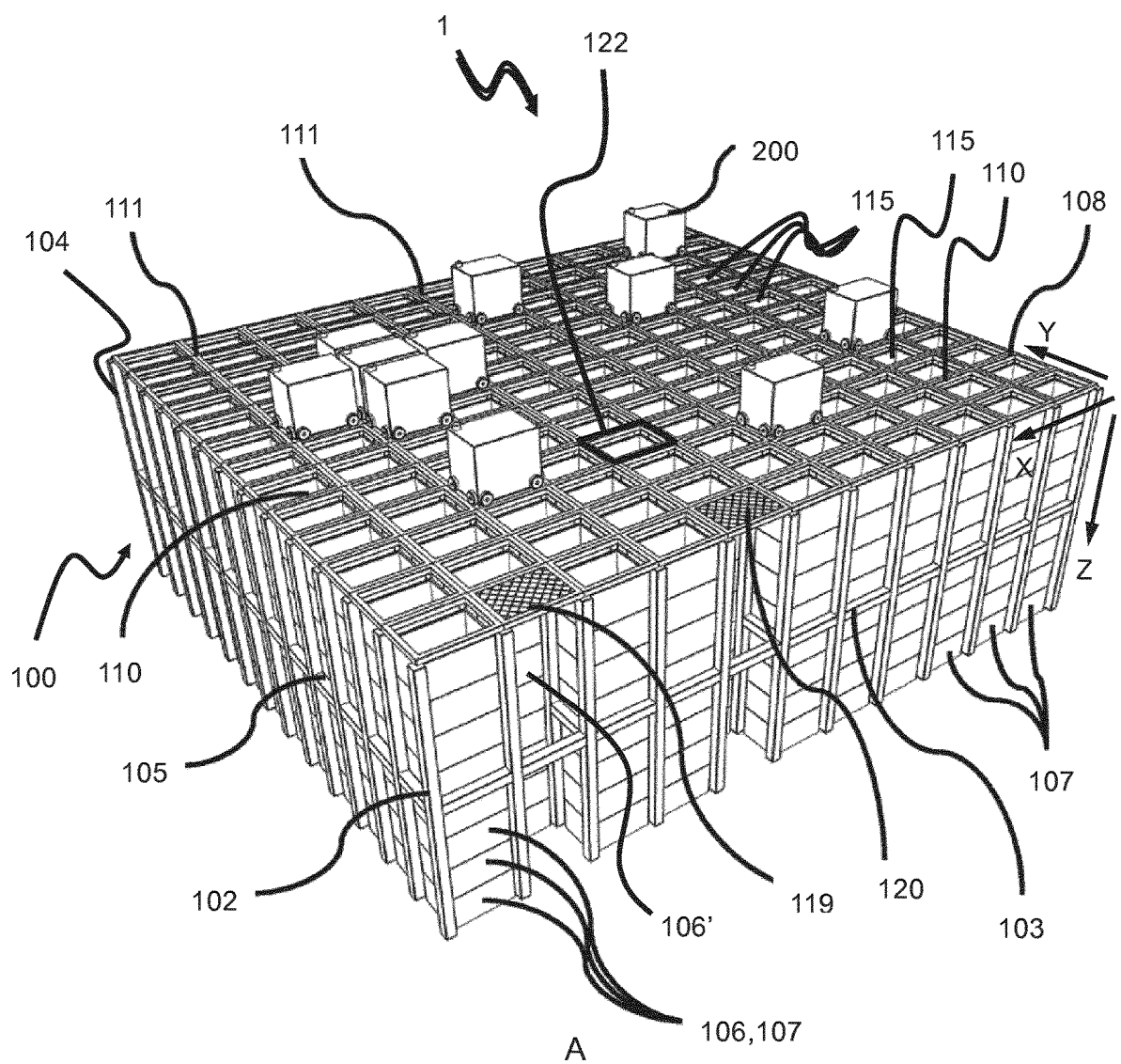
FIGS. 1A-D are perspectives view of a prior art automated storage and retrieval system, where FIG. 1A and FIG. 1 C shows the complete system and FIG. 1 B and FIG. 1 D shows examples of system operable prior art container handling vehicles.
Figure 1:
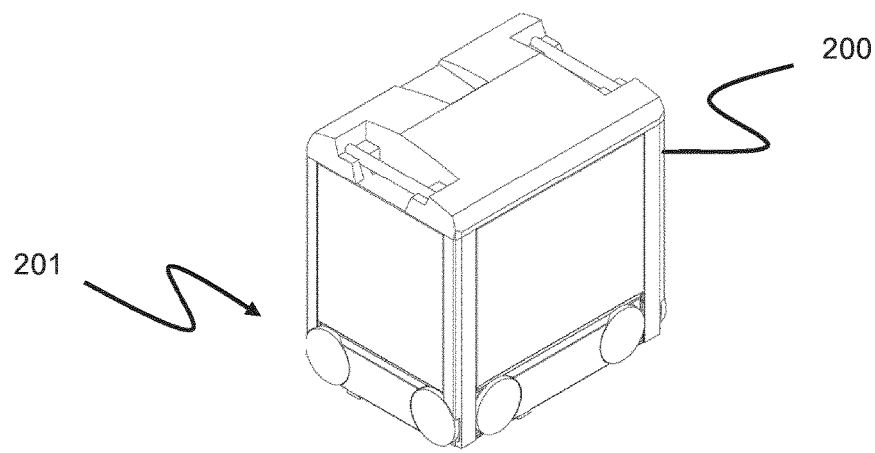
Figure 1:
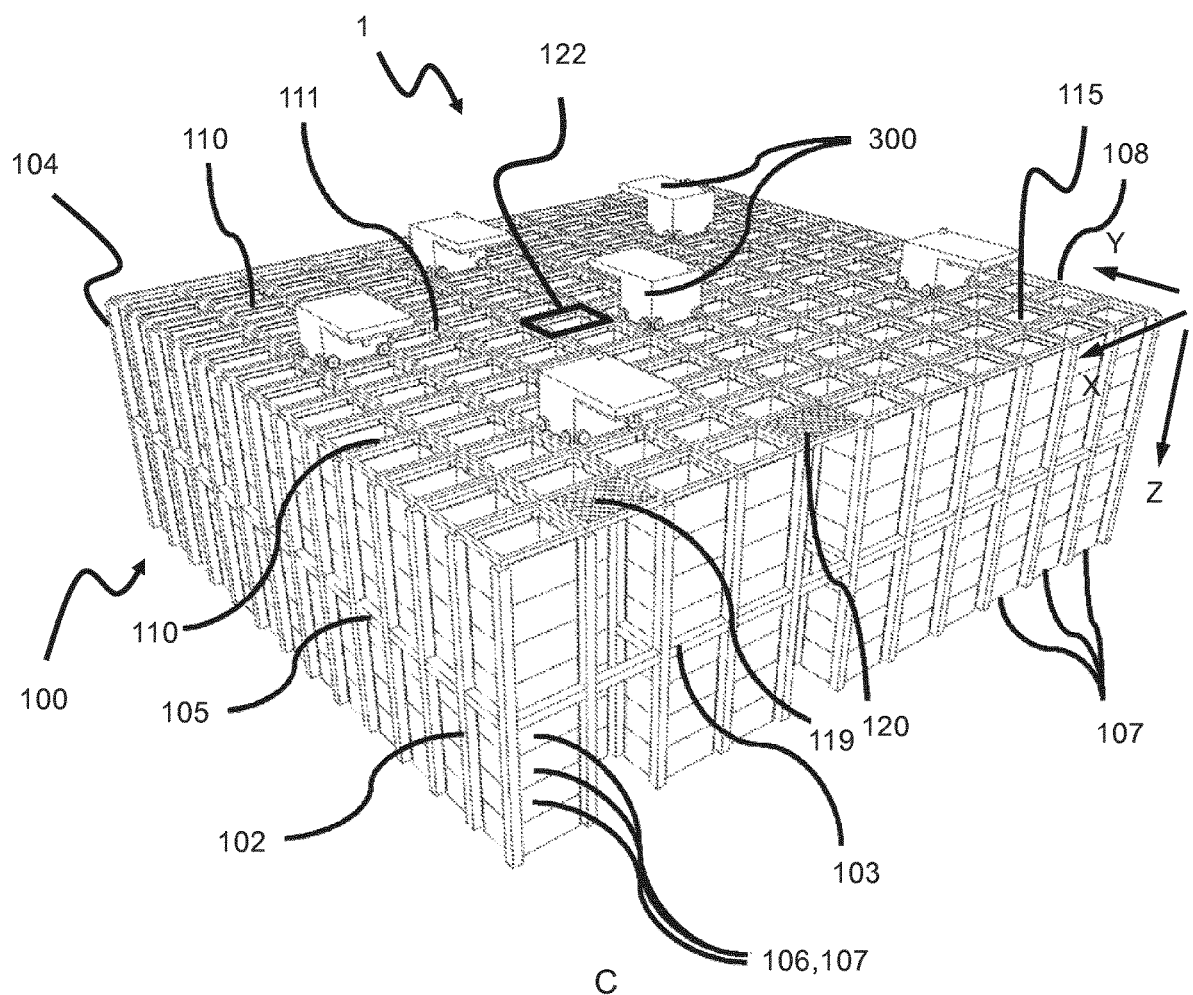
Figure 1:
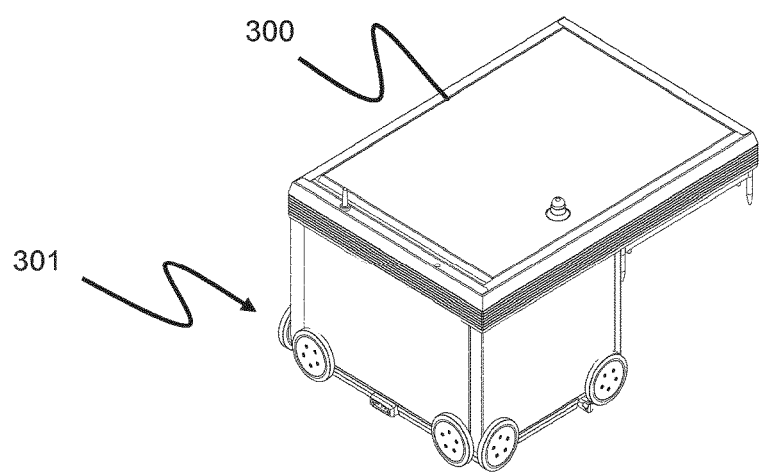

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the delivery vehicles and related methods as well, and vice versa. Hence, any features described in relation to the delivery vehicle only, and/or related methods, are also valid for the system.

With reference to FIGS. 1A-D the storage grid 104 of each storage structure 1 constitutes a framework 100 of in total 143 grid columns 112, where the width and length of the framework corresponds to the width and length of 13 and 11 grid columns 112, respectively. The top layer of the framework 100 is a rail system 108 onto which a plurality of container handling vehicles 200,300 are operated.

The framework 100 of the storage system 1 is constructed in accordance with the above mentioned prior art framework 100 described above, i.e. a plurality of upright members 102 and a plurality of horizontal members 103 which are supported by the upright members 102, and further that the horizontal members 103 includes the rail system 108 of parallel rails 110,111 in the X direction and the Y direction, respectively, arranged across the top of storage columns 105. The horizontal area of a single grid cell 122, i.e. along the X and Y directions, may be defined by the distance between adjacent rails 110 and 111, respectively (see also FIGS. 2B and 2C). In FIGS. 1A and 1C, such a grid cell 122 is marked on the rail system 108 by thick lines.

The rail system 108 allows the container handling vehicles 200,300 to move horizontally between different grid locations, where each grid location is associated with a grid cell 122.

In FIGS. 1A and 1C the storage grid 104 is shown with a height of eight cells. It is understood, however, that the storage grid 104 can in principle be of any size. In particular it is understood that storage grid 104 can be considerably wider and/or longer than disclosed in FIGS. 1A and 1C. For example, the grid 104 may have a horizontal extent of more than 700×700 grid cells 122. Also, the grid 104 can be considerably deeper than disclosed in FIGS. 1A and 1C. For example, the storage grid 104 may be more than twelve grid cells deep.

The storage container vehicles 200,300 may be of any type known in the art, e.g. any one of the automated container handling vehicles disclosed in WO2014/090684 A1, in NO317366 or in WO2015/193278A1.

Figure 2:
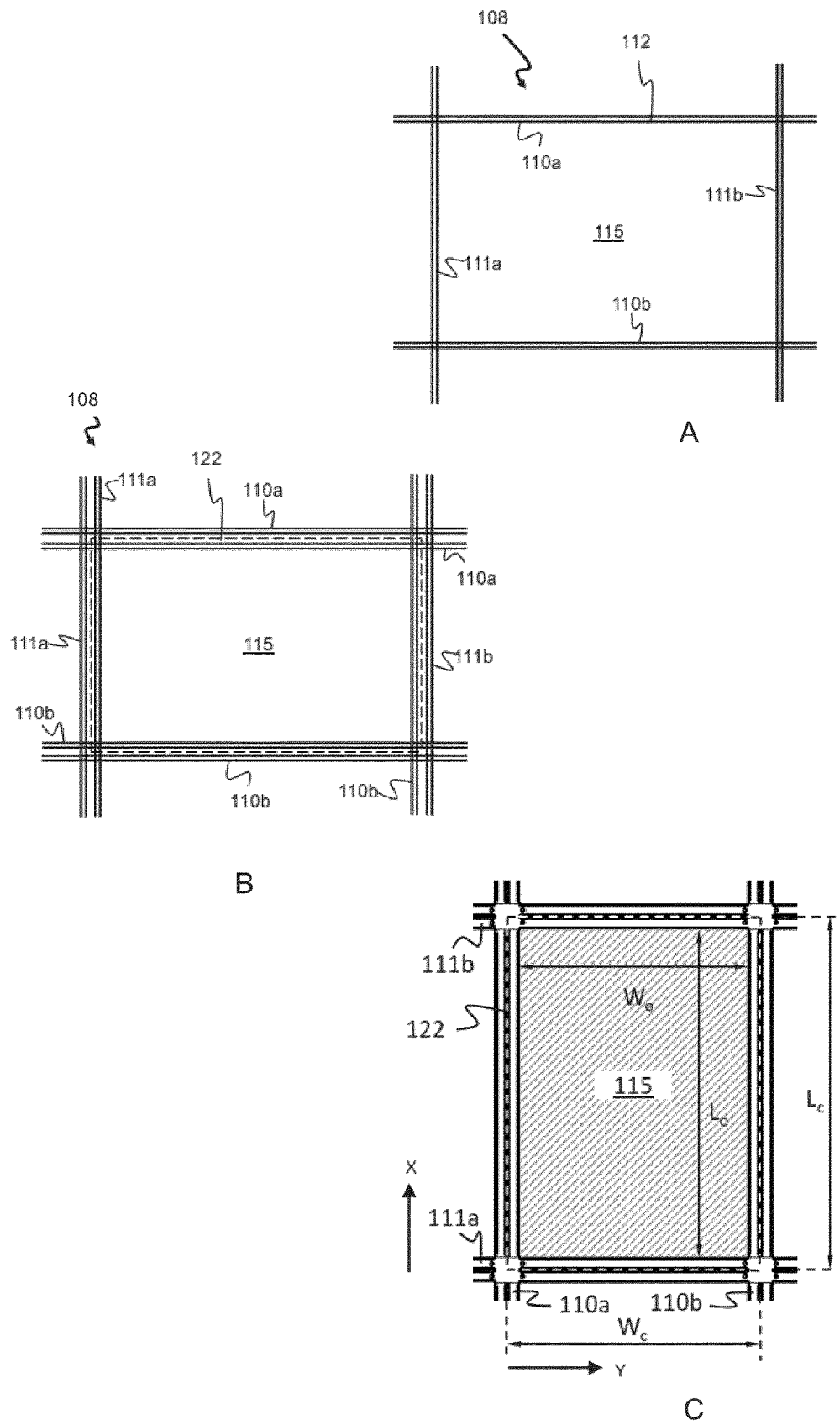
FIGS. 2A-C is a view from top of a grid cell comprising a set of parallel rails arranged to guide movement of a remotely operated vehicle.

The rail system 108 may be a single rail system, as is shown in FIG. 2A. Alternatively, the rail system 108 may be a double rail system, as is shown in FIG. 2B. The rail system 108 may also be a combination of single and double rails. Details of the single and double rail system are disclosed this specification under the section of background and prior art.

FIG. 3A-C shows an embodiment of a remotely operated delivery vehicle 30, hereinafter referred to as a delivery vehicle 30.

The delivery vehicle 30 is configured for transport of a storage container 106 (not shown in FIG. 3C) between an automated storage and retrieval grid 104 (see FIGS. 4A and B) configured to store a plurality of stacks 107 of storage containers 106, hereinafter referred to as a storage grid 104, and an access opening 63 provided in a container accessing station 60 for handling of the storage container 106 by at least one of a robotic operator and a human operator.

Said delivery vehicle 30 comprises; a vehicle body 31, at least one rolling device 32a, 32b connected to the vehicle body 31, at least one rolling device motor for driving the rolling device 32a, 32b in a horizontal plane (P), and a power source (not shown) connected to the rolling device motor. The power source should provide sufficient power to the rolling device motor (not shown) to propel the rolling device 32a, 32b over a set route from the storage grid 104, for example, to an access station 60.

The delivery vehicle 30 may further comprise a container carrier 35 mounted above the vehicle body 31. The container carrier 35 should be configured to receive the storage container 106, for example, onto or within the container carrier 35, such that the storage container 106 is prevented from sliding in a horizontal plane (P1) with respect to the delivery vehicle 30.

The container carrier 35 may comprise a container supporting device supporting the storage container 106 from below.

In FIG. 3A-B the container carrier 35 is disclosed in the form of a storage container receiving compartment having a bottom/base and side walls. The volume of the compartment is shown in this exemplary configuration such that it may receive and contain the entire horizontal extent of the storage container and at least a part of the vertical extent of the storage container.

The particular configuration of the container carrier 35 disclosed in 3 A-B allows the delivery vehicle 30 to transport storage containers 106 having different heights.

Note that the size of the compartment within the container carrier 35 may easily be adapted for receiving and supporting a multiple number of storage containers 106 in one operation.

Figure 3:
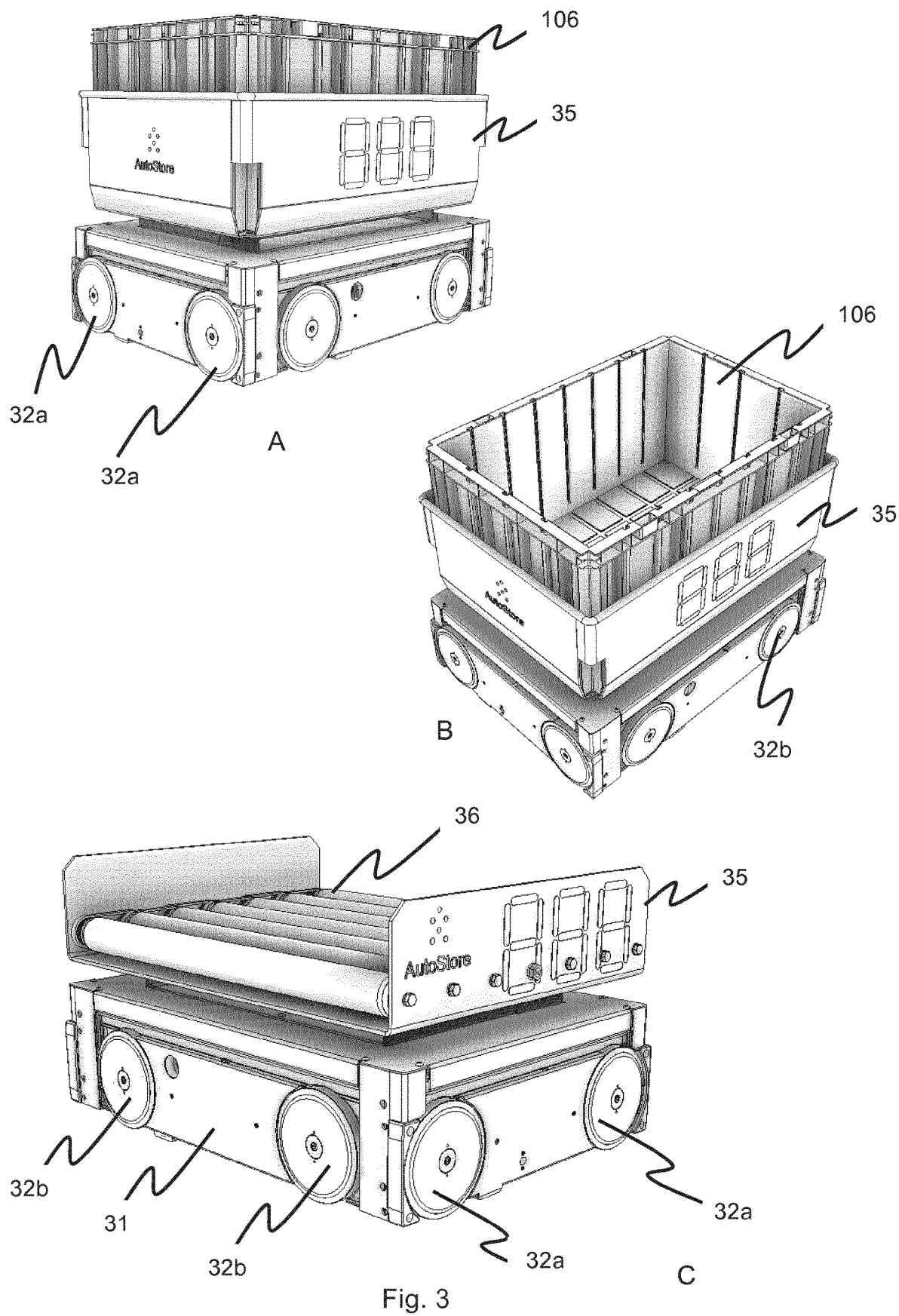
FIGS. 3A-C show different versions of a remotely operated delivery vehicle arranged for transporting a storage container between a storage grid and a container accessing station.

FIG. 3 C shows yet another exemplary configuration of the remotely operated delivery vehicle 30. In this configuration the container carrier 35 comprises a base plate, a conveyor arranged on the base plate and two side walls protruding upwards from the base plate. The rolling device 32 and the vehicle body 31 are the same as or similar to the rolling device 32 and the vehicle body 31 described above.

The conveyor may be set up by inter alia a plurality of parallel oriented rolls 36 having a common longitudinal direction perpendicular to the two side walls. In this way the rolls 36 allow one or more storage containers 106 to be shifted into or off the container carrier 35 while being guided by the side walls. The conveyor may be connected to a conveyor motor allowing rotation of one or more of the rolls.

Figure 4:
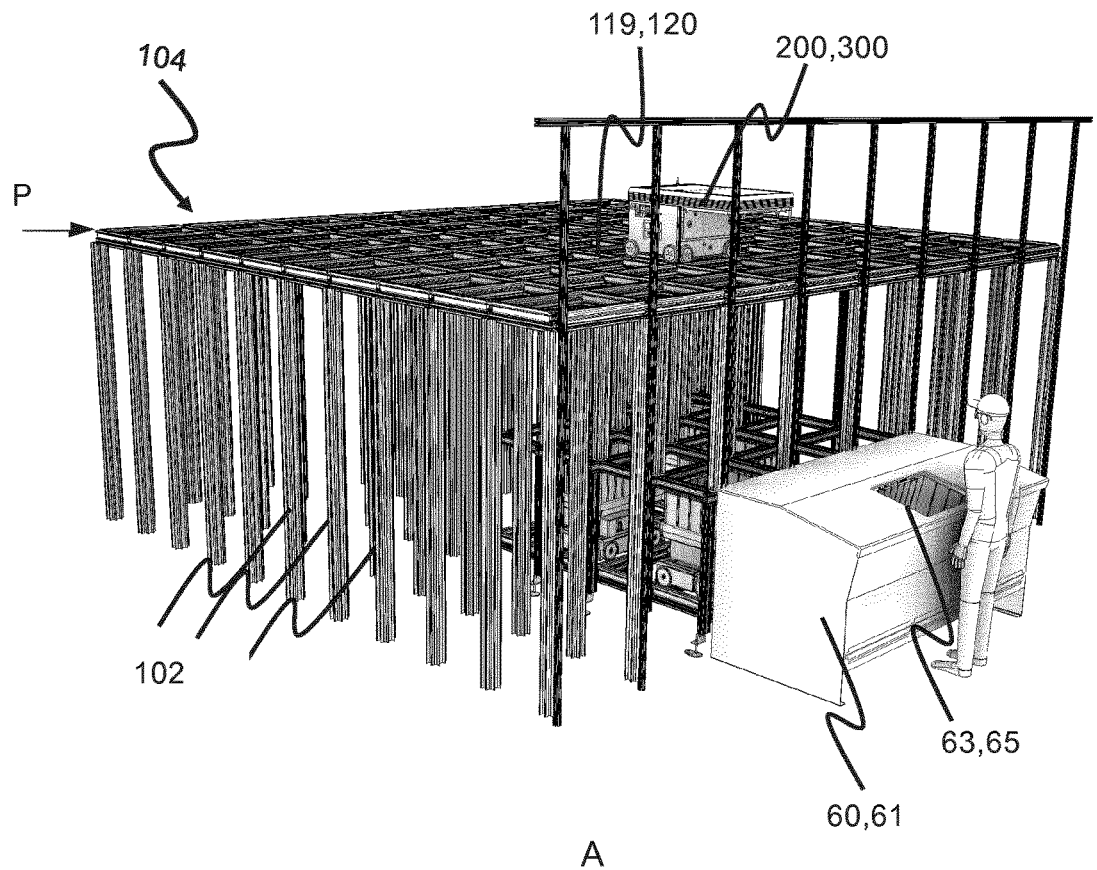
FIGS. 4A-B are perspective views of other automated storage and retrieval grids and delivery systems for transporting storage containers between the storage grid and a container accessing station.
Figure 4:
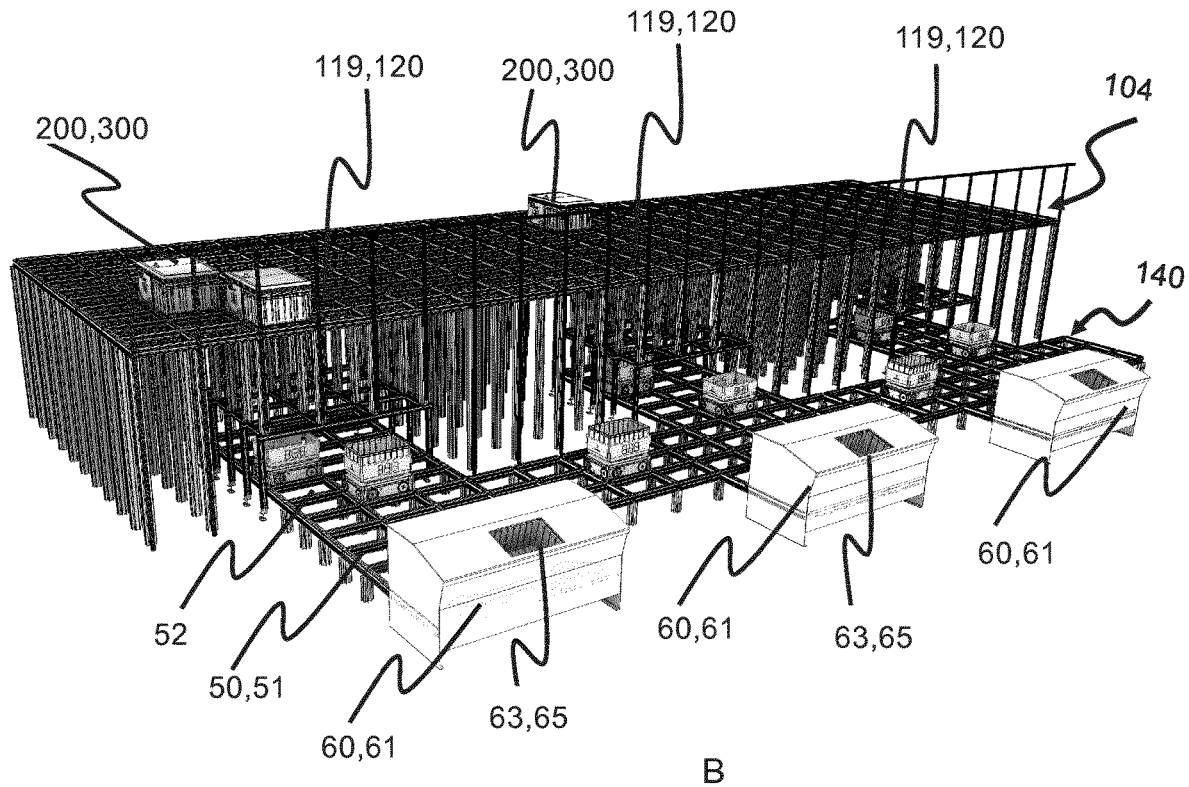

Perspective views of an automated storage and retrieval system are shown in FIG. 4 A-B. The system comprises a storage grid 104 and a delivery system 140 comprising a delivery rail system 50, and a plurality of delivery vehicles 30 operating on the delivery rail system 50.

The storage grid 104 is may be the same as or similar to the prior art storage grid 104 as described above, i.e. a storage grid 104 comprising a rail system 108; a plurality of stacks 107 of storage containers 106, a plurality of container handling vehicles 300 for lifting and moving storage containers 106 stacked in the stacks 107 and a delivery column 119,120 configured to receive a storage container 106 from a container handling vehicle 300.

The delivery system 140 comprises one or more of the delivery vehicles 30 as described above, i.e. delivery vehicles 30 configured to receive and support a storage container 106 for transport between one or more delivery columns 119,120 and one or more container handling stations 60 located outside the storage grid 104. The container handling station 60 may be located in any predetermined position suitable for handling containers.

The delivery system 140 may further comprise a delivery rail system 50 situated below a delivery port 150 of the one or more delivery columns 119,120.

The delivery system 140 is arranged such that storage containers 106 delivered through the delivery column 119, 120 by container handling vehicles or a lift, may effectively be received by a delivery vehicle 30 below the delivery port 150 and transported away on the delivery rails 50 to the container accessing station 60, thereby avoiding congestion of storage container 106 at the delivery columns 119,120.

As shown in FIG. 4A-B, the delivery rail system 50 may be constructed in the same way or a similar way as the rail system 108 for the container handling vehicles 200,300. The delivery rail system 50 extends at least from the delivery port 150 of one or more delivery columns 119,120, and to the at least one container accessing station 60, such that each storage container 106 can be transported into the container accessing station 60 where items held in the storage container 106 may be accessed.

The container accessing station 60 may comprise a cabinet 61 comprising walls and a top cover supported thereon, as shown in FIG. 5A-B. The items held in the storage containers 106 carried by the delivery vehicle 30 and transported to the container accessing station 60 are reachable through an access opening 63 in the top cover of the cabinet 61.

The cabinet 61 is arranged adjoining the storage grid 104, where the delivery rail system 50 extends from below the delivery ports 150 and to the access point 65 of the container accessing station 60.

The container accessing station 60 comprises an access opening 63 through which a human and/or robotic operator may access contents of the container 70,106.

The term container may be a storage container, KLT container, packing or order boxes etc., suitable for transport on the delivery vehicle 30.

Figure 5:
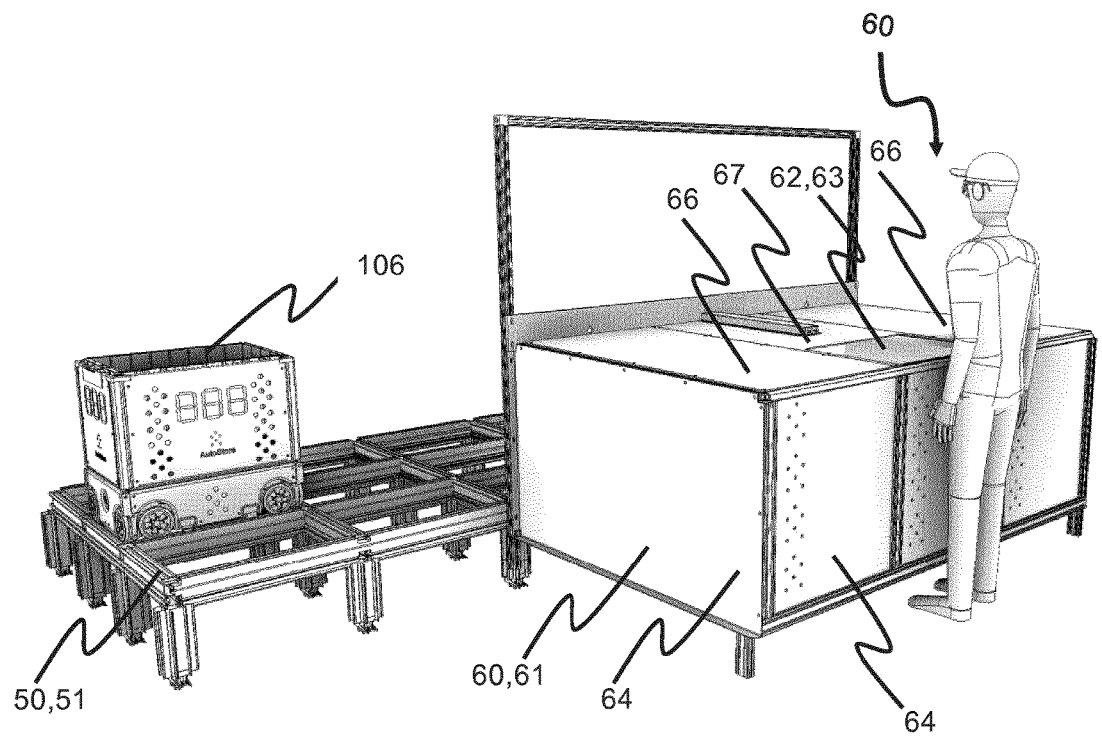
FIG. 5 shows a container accessing station with three working surface sections.

FIG. 5 shows a container accessing station 60 according to an embodiment of the present invention. The container accessing station 60 comprises a working surface provided by one or more working surface sections 66,67, each working surface section having a common attachment configuration to allow either an access panel 67 or a blanking-off panel 66 to be fitted as part of the container accessing station 60 at any of multiple access points 65. The FIG. 5 shows three working surfaces sections 66,67; where the access panel 67 is arranged in the middle and the blanking off-panel 66 at each side of the access panel 67.

If access to further access point 65 is required, one or more of the blanking off-panels 66 may be replaced by one or more access panels 67.

Hence, the container accessing station 60 is configured to offer multiple access points 65 where access to each access point 65 may be permitted through an upper working surface of the container accessing station 60 to an underlying container 106 that has been delivered to the access point 65.

A container accessing station 60 may comprise a top surface support structure 68 supporting the one or more working surface sections 66,67. It may be preferable the access panels 67 and the blanking-off panels 66 each having the same size and a rectangular shape such that they may easily replace each other on the top surface support structure 68.

The top surface support structure 68 may comprise rails and/or bars supporting an outer perimeter of the working surface section 68.

Figure 6:
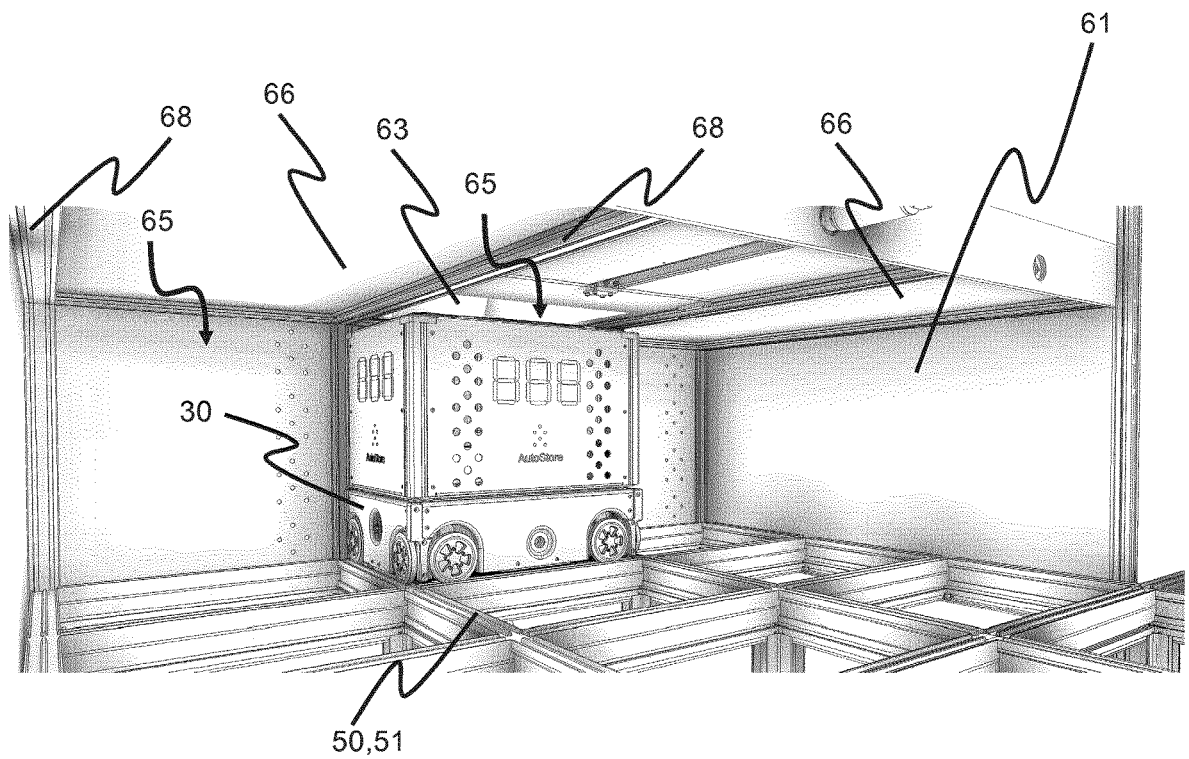
FIG. 6 shows the inside of the container accessing station with a remotely operated vehicle and a delivery rail extending into the station.

As seen in FIG. 6 each working surface section 66,67 may be supported at their perimeter by a top surface support structure 68 comprising rails and/or bars provided at the top of the container accessing station 60.

The top surface support structure 68 may have a rectangular frame-like shape such that the working surface sections 66,67 easily can be placed onto the top surface support structure 68 and such that the top surface support structure 68 supports the outer perimeter of each of the working surface sections 66,67.

Figure 7:
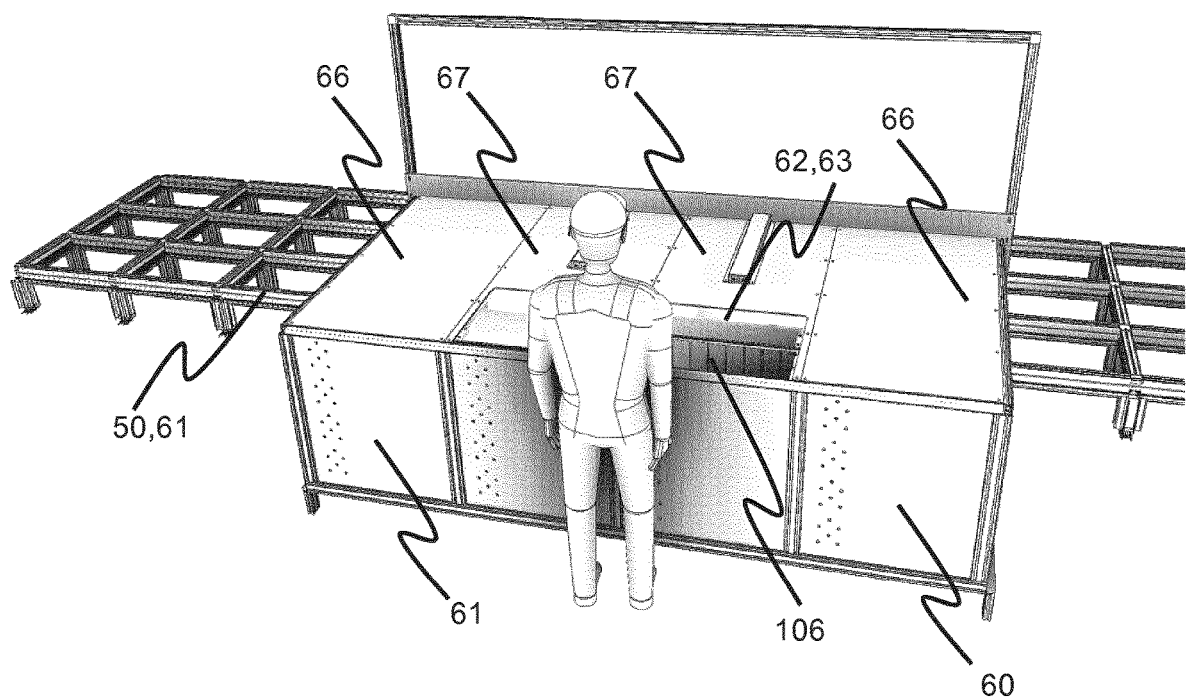
FIG. 7 shows a container accessing station comprising four working surface sections; two access panels in the middle and two blanking off-panels, one at each side.
Figure 8:
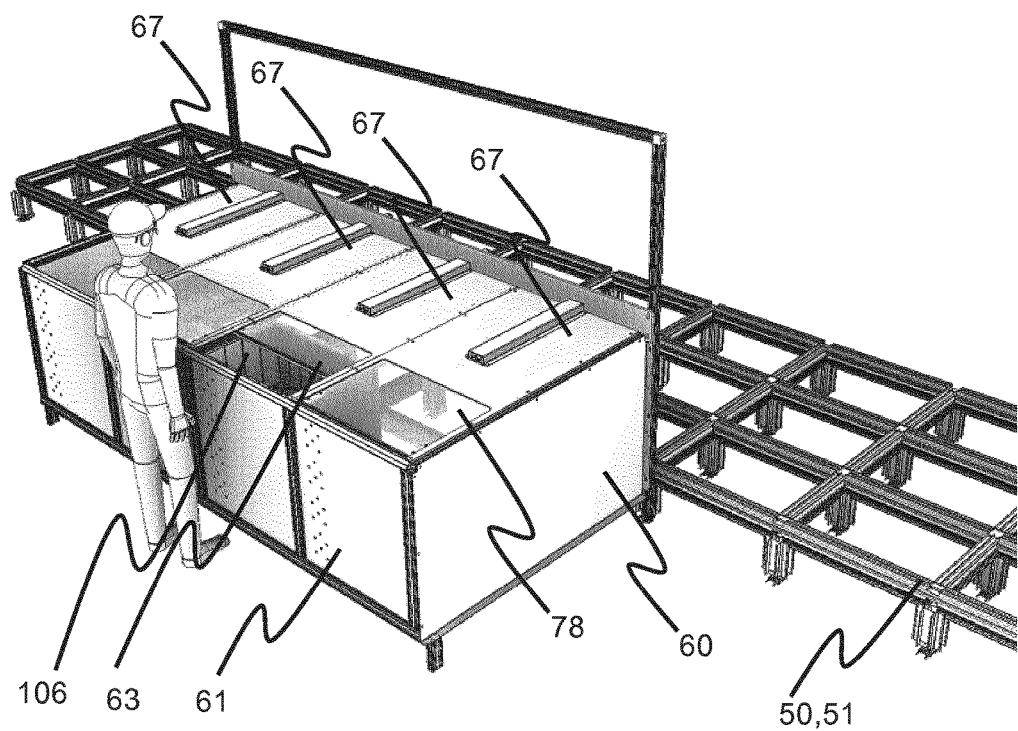
FIG. 8 shows a container accessing station comprising four working surface sections; all four sections constitutes access panels.

The working surface section may be attached to the top surface support structure 68 by screws as shown in FIGS. 5,7 and 8.

FIG. 6 shows a remotely operated vehicle 30 positioned at the access point 65 on a delivery rail system 50. The delivery rail system 50 extending into the container accessing station 60 providing a plurality of potential access points 65. An access panel 67 is provided above the access point 65 such that items in the storage container 106 (not shown) are accessible through the opening 63 provided in the access panel 67.

The container accessing station 60 may be delivered from a factory in a standard module, such as a cabinet, comprising for example four rows of working surface sections with walls or a wall structure supported thereon. Each of the working surface sections may be blanking off-panels 66 that can be removed and replaced by an access panel 67 if access to the underlying access point 65 is required.

FIG. 7 shows an embodiment where the two middle sections has been replaced by access panels 67, thus allowing access through the upper working surface of the container accessing station 60 to an underlying container 106 that has been delivered to the access point 65.

FIG. 8 shows the container accessing station 60 in FIG. 7 where additional two of the sections are replaced by access panel 67 such that there are total four access panels in the container accessing station. There might be different reasons for the reconfiguration e.g., to reconfigure the working surface in order to accommodate an increase in picking capacity etc. or perhaps it is sold as a base support and a selection of panels that the purchaser decides where to fit the panels in the original set-up.

The control system (not shown) may be updated to know that there has been an increased capacity in the container accessing station by the additional access panels and where the access panels is located.

Any one of the four access panels 67 may later be replaced by a blanking off-panel 67 if required, and similarly the control system is updated with the new configuration.

As shown in FIGS. 7 and 8, the container accessing station 60 may comprise a deployable cover 78 for restricting access through the access opening 63.

The deployable cover 78 may be a retractable cover 78. The cover 78 may be arranged to open only if predetermined conditions are satisfied (e.g. if access to a container is authorised) and may thereby permit access to a container 70,106 through the access opening 63 when the container 70,106 is located at the access point 65.

The cover 78 may be transparent and may allow the contents of a container 106 to be viewed from outside the container accessing station 60.

Figure 9:
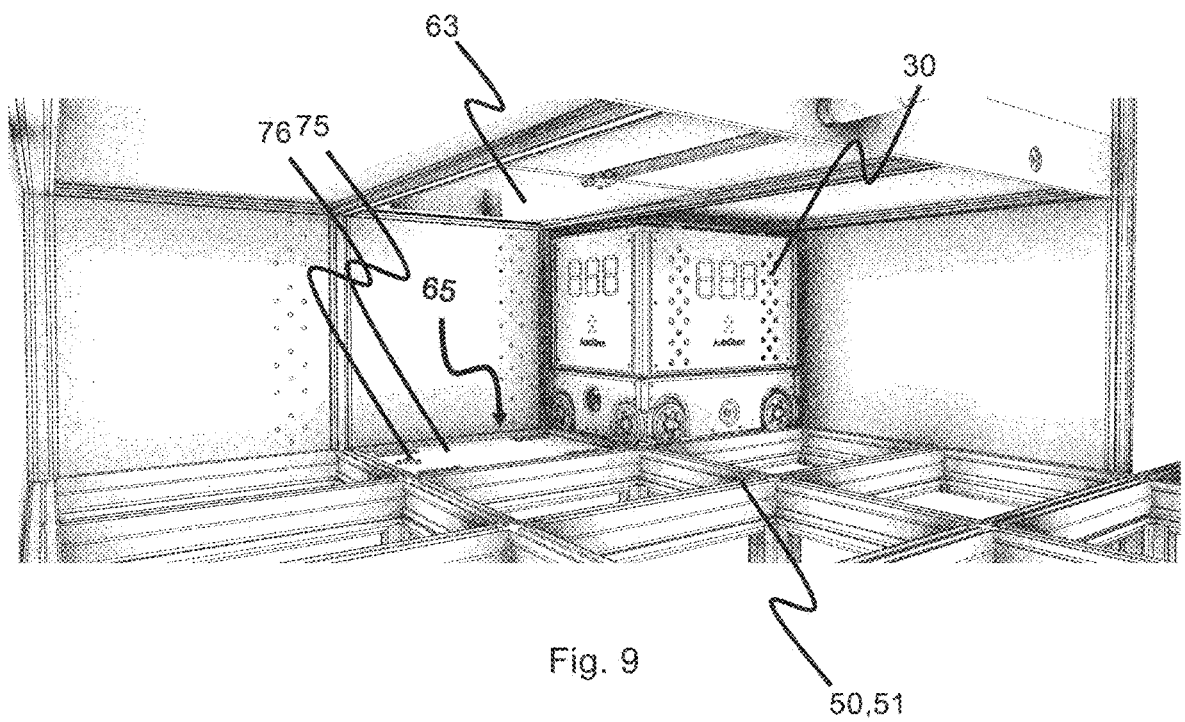
FIG. 9 show the inside of a container accessing station with delivery rail, remotely operated vehicle and a vehicle locking device provided at the access point.
Figure 10:
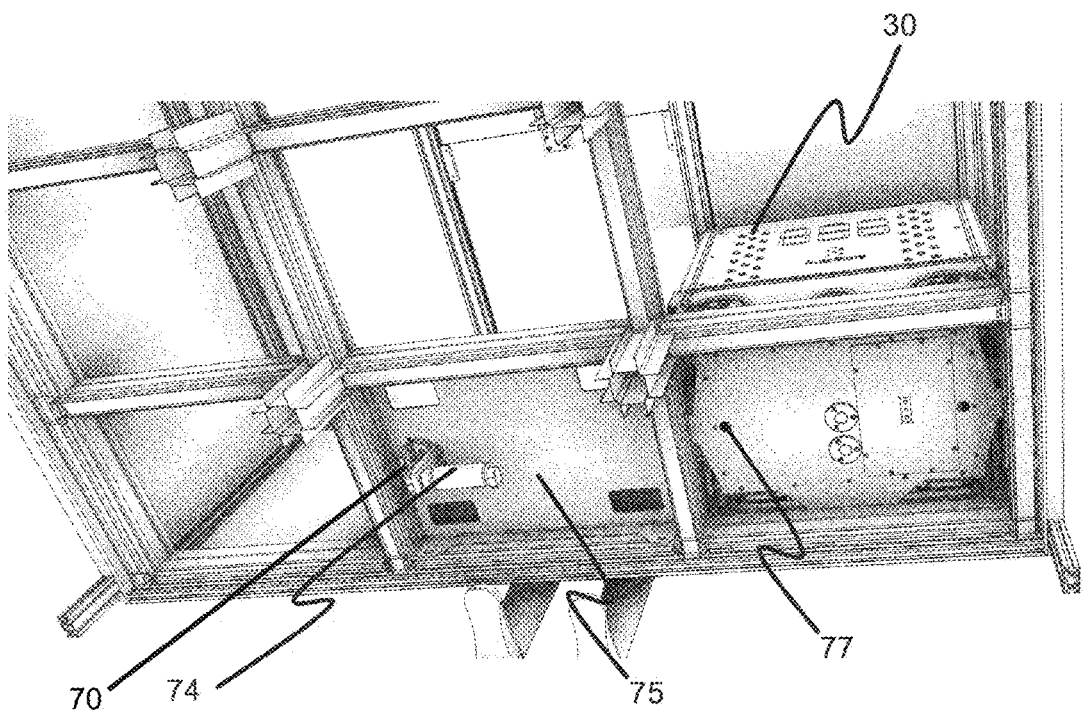
FIG. 10 shows the same embodiment of FIG. 9 viewed from the underside.

FIGS. 9 and 10 shows a remotely operated (delivery) vehicle 30 and a locking device 70 for locking the delivery vehicle 30 at the access point 65 for providing safety to the operator at the container accessing station 60.

The locking device 70 may comprise a locking element connected to a movable locking bolt and arranged on a panel structure 75 at the access point 65.

The locking device 70 and panel structure 75 may be arranged directly below the access opening 63 of the access panel 67.

Actuation of a motor 74 causes one end of the locking bolt to be raised through an opening 76 in the panel structure 75 such that it projects above the panel structure 75 and it engages with a part of the delivery vehicle 30.

The locking bolt is sized and shaped to fit into an opening 77 in the delivery vehicle 30. The locking bolt may be cylindrical and fit into a circular opening 77 in the delivery vehicle 30, as shown, but other configurations are also possible. In this example, the opening 77 is provided in the underside of the delivery vehicle 30 (see FIG. 10), for example, in a floor panel of the vehicle body 31.

Thus, the locking device 70 is arranged to be able to lock the delivery vehicle 30 against accidental displacement prior to any interaction with a human operator and/or a robotic operator. In the arrangement shown with the container accessing station 60, this may be before access is allowed to the delivery vehicle 30 or the contents of the storage container 106 carried by the delivery vehicle 30 by the container accessing station 60. The locking device 70 may then unlock the delivery vehicle 30 once interaction with the human and/or robotic operator is no longer required. This may be when access to the delivery vehicle 30 or the contents of the storage container 106 is no longer possible because an access opening 63 of the container accessing station 60 has been closed.

Figure 11:
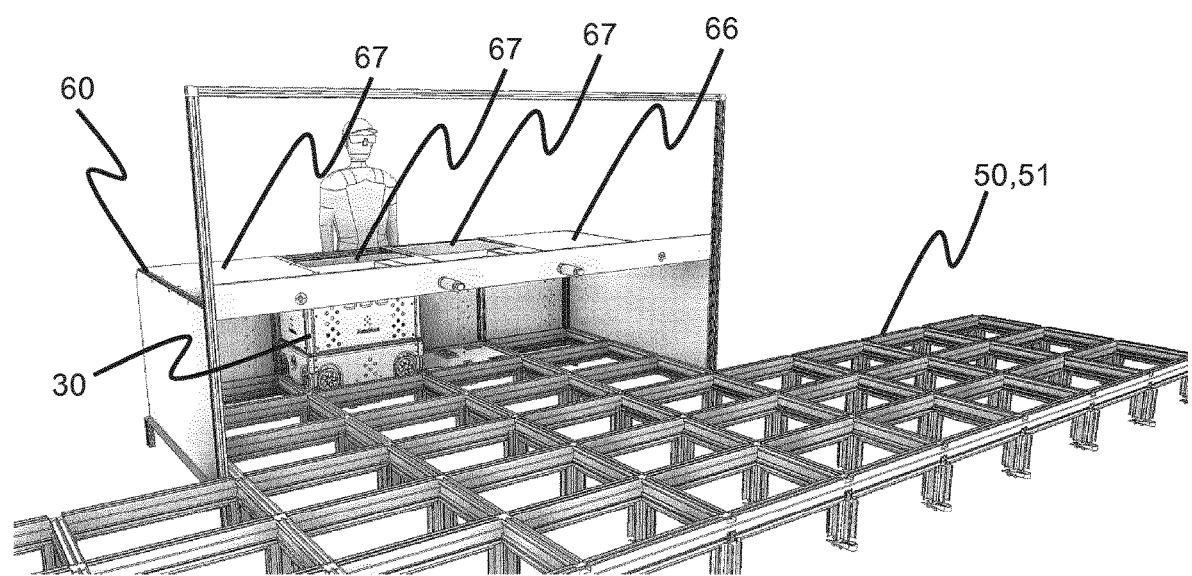
FIG. 11 shows a container accessing station of the present invention with a delivery rail extending into the access station and providing a plurality of access points.

FIG. 11 shows a container accessing station 60 comprising a cabinet 61 comprising walls and four working surfaces supported thereon, each of the four working surfaces are provided above respective potential access points 65. FIG. 11 shows that the two middle sections have been arranged with access panels 67 such that access to a container 106 carried by a delivery vehicle 30, is possible through the opening 63 provided in the access panel 67.

The two access openings 63 may be provided with deployable covers and arranged to open only if a predetermined condition is satisfied and thereby permit access to the container 70,106 through the access opening 63.

REFERENCE NUMERALS

30 Delivery vehicle
31 Vehicle body
32 Rolling device
32a First set of wheels
32b Second set of wheels
35 Container carrier
36 Rolls of conveyor
50 Delivery rail system
51 Delivery grid
52 Delivery grid cell
60 Container accessing station
61 Cabinet
63 Opening top cover of cabinet/access opening
65 Access point
66 Blanking off-panel
67 Access panel
68 Top surface support structure
70 Container
74 Motor
75 Panel structure
76 Opening panel structure
77 Opening vehicle body
78 Deployable cover
P1 Horizontal plane of delivery rail system
100 Framework structure
102 Upright members of framework structure
103 Horizontal members of framework structure
104 Storage grid/three-dimensional grid
105 Storage column
106 Storage container
107 Stack
108 Rail system
110 First set of parallel rails in first direction (X)
111 Second set of parallel rails in second direction (Y)
115 Grid opening
119 Delivery column
120 Delivery column
122 Grid cell
140 Delivery system
150 Delivery port
200 First container handling vehicle
201 Wheel arrangement
300 Second container handling vehicle
301 Wheel arrangement
X First direction
Y Second direction
P Horizontal plane of rail system

The invention claimed is:

1. A container accessing station configured to offer multiple access points where access to each access point may be permitted through an upper working surface of the container accessing station to an underlying storage container that has been delivered to the access point,
    wherein the container accessing station further comprises a working surface provided by one or more working surface sections, each working surface section being an access panel or a blanking-off panel, wherein each working surface section having a common attachment configuration to allow either the access panel or the blanking-off panel to be fitted as part of the container accessing station at any of the multiple access points,
    wherein a locking device configured to restrict movement of a delivery vehicle is provided on the access panel.

2. The container accessing station according to claim 1, wherein the one or more working surface sections is provided as a row of working surface sections.

3. The container accessing station according to claim 1, wherein the container accessing station comprises a top surface support structure arranged to support each working surface section from below.

4. The container accessing station according to claim 3, wherein the top surface support structure comprises rails or bars supporting an outer perimeter of the working surface section.

5. The container accessing station according to claim 1, wherein the access panel comprises a portion of an electrical or control connector for providing power to or control of moving parts.

6. The container accessing station according to claim 1, wherein the access panel comprises an access opening provided with an automated shutter which is openable to provide access to the underlying container that has been delivered within the container accessing station to beneath the access point in the upper working surface of the container accessing station.

7. The container accessing station according to claim 6, wherein the automated shutter is a retractable cover arranged to open only if a predetermined condition is satisfied and thereby permit access to the storage container through the access opening.

8. A delivery system comprising the container accessing station according to claim 1, wherein the delivery system comprises:
    a delivery rail comprising at least a first set of parallel rails arranged in a horizontal plane and extending in a first direction, and at least a second set of parallel rails arranged in the horizontal plane and extending in a second direction which is orthogonal to the first direction, the at least first and second sets of rails together defining a delivery grid of delivery grid cells, wherein the delivery vehicle is comprised by the delivery system and is adapted for carrying the storage container and operating on the delivery rail for transporting the storage container to or from the container accessing station, wherein the locking device is arranged for locking the delivery vehicle to the delivery grid at the access point.

9. The delivery system according to claim 8, wherein the delivery grid extends into the container accessing station and provides one or more delivery grid cells for the delivery vehicle at the access point as well as a plurality of delivery grid cells adjacent the one or more delivery grid cells of the access point, such that there is more than one path to or from the access point for the delivery vehicle via the plurality of delivery grid cells.

10. The delivery system according to claim 8, wherein one or more sensors is arranged to detect the delivery vehicle in a locking position, and one or more sensors is arranged to register the position of a retractable cover.

11. The delivery system according to claim 10, wherein a control system of the delivery system receives information from the one or more sensors and operates the retractable cover to open only when the delivery vehicle is locked at the access point.

12. A method of reconfiguring the container accessing station according to claim 1, wherein the method comprises:
- unlocking a first surface section by releasing or removing attachment means securing the first surface section to a top surface of the container accessing station,
- removing the first surface section,
- replacing the first surface section by a second surface section,
- locking the second surface section to the top surface of the container accessing station by the attachment means, and
- updating a control system to know that a new access point has been provided or closed below the second surface section.

* * * * *